(12) United States Patent
Marchand et al.

(10) Patent No.: US 6,326,872 B1
(45) Date of Patent: Dec. 4, 2001

(54) POWER CIRCUIT BREAKER WITH AIR GAP BETWEEN MOLDED INSULATIVE CASING AND GROUNDED BARRIER INSULATING OPERATING MECHANISM

(75) Inventors: Francois J. Marchand, Pittsburgh; Norman Davies; Robert J. Rinefierd, Jr., both of Irwin; Glenn A. Calhoon, Aliquippa; Walter O. Jenkins, Crafton, all of PA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/567,797

(22) Filed: May 9, 2000

(51) Int. Cl.⁷ ....................................... H01H 9/02
(52) U.S. Cl. ......................... 335/202; 218/155; 218/139
(58) Field of Search ................... 335/132, 202, 335/167–176, 8–10; 218/42, 118–9, 139–40, 154–5, 157; 200/293–308

(56) References Cited

U.S. PATENT DOCUMENTS

| | | | |
|---|---|---|---|
| 3,895,199 | * | 7/1975 | Frewe et al. .......................... 200/305 |
| 4,025,883 | * | 5/1977 | Slade et al. ........................... 335/178 |
| 5,521,567 | * | 5/1996 | Devonald, III et al. ............. 335/132 |
| 5,668,361 | * | 9/1997 | Moncke et al. ....................... 218/118 |
| 5,927,482 | | 7/1999 | Davies . |
| 5,931,290 | | 8/1999 | Wehrli, III et al. . |

* cited by examiner

Primary Examiner—Lincoln Donovan
(74) Attorney, Agent, or Firm—Martin J. Moran

(57) ABSTRACT

A compact power circuit breaker has a molded insulative casing providing the structural support and electrical isolation for the pole mechanisms mounted in cavities in the casing and the operating mechanism mounted to the front of the casing. A grounded barrier between the pole mechanisms and the operating mechanism protects the operator actuating push buttons controlling the operating mechanism and accessible through a molded insulative cover. Preferably, the grounded barrier is sandwiched between a rear section of the molded casing containing the pole cavities and a forward section to which the operating mechanism is secured. The grounded barrier is connected to an electrically conductive pan extending under the molded insulative casing which also houses electrically grounded linkages coupling the operating mechanism to the vacuum interrupters of the pole mechanisms. A vented air gap between the rear section of the molded insulative casing and the grounded barrier minimizes erosion of the molded insulative casing in the event of an arc penetrating the casings to the grounded barrier.

10 Claims, 4 Drawing Sheets

POWER CIRCUIT BREAKER WITH AIR GAP BETWEEN MOLDED INSULATIVE CASING AND GROUNDED BARRIER INSULATING OPERATING MECHANISM

RELATED APPLICATION

Commonly owned, concurrently filed application Ser. No. 09/567,313 entitled "Power Circuit Breaker Having Molded Insulative Casing with a Dead Front".

BACKGROUND OF THE INVENTION

1. Field of the Invention

This invention relates to power circuit breakers and particularly to a compact power circuit breaker having a molded insulative casing with a ground plane barrier between the pole mechanisms and the operating mechanisms and an air gap between the casing and the barrier on the side of the barrier facing the pole mechanisms.

2. Background Information

Power circuit breakers for systems operating above about 1,000 volts typically utilize vacuum interrupters as the switching devices. The vacuum interrupters for each phase must be adequately electrically isolated from each other for the operating voltage. Where sufficient space is available, the vacuum interrupters and associated conductors can be spaced apart sufficiently to achieve the required isolation. For the higher voltages, or for a more compact arrangement, each vacuum interrupter is housed in a separate pod molded of an electrically insulative material such as a polyglass. These molded pods in turn are bolted to a metal box containing the operating mechanism. The metal box is grounded to isolate the operating mechanism from the line voltage of the power circuit. Manual controls for the operating mechanism are accessible at the front face of the metal box. The metal box provides structural support for the separately housed vacuum interrupters and the operating mechanism. As the metal box is grounded, it also provides a "dead front" for the breaker which increases protection of the human operator from the high voltage of the power circuit. This is particularly important if there is a fault within the power section of the breaker. The metal box also provides electromagnetic shielding where the operating mechanism includes sensitive electronics such as an electronic trip unit.

There are some circuit breakers at the lower end of the power breaker voltage range which house the phase vacuum interrupters in bays within a single piece molded insulative casing. However, these circuit breakers also use a metal box to house the operating mechanism, and to provide a dead front and electromagnetic shielding.

A need has been identified for reducing the size of power circuit breakers in the above 1,000 volt range. However, this also requires reducing the size of the operating mechanism. A smaller operating mechanism delivers less energy which presents a challenge. A considerable amount of energy is required to close a power breaker into the sizable current in a distribution system in which loads are turned on. The ductile steel boxes in which the operating mechanisms are currently supported absorb a substantial amount of energy in deflection and distortion, but the mechanism is sufficiently robust to accommodate such losses. The smaller operating mechanisms required for the compact power circuit breaker cannot afford such losses. Consideration must also be given to protecting molded insulative structures from destructive arcing.

Our commonly owned, concurrently filed application Ser. No. 09/567,313 entitled "Power Circuit Breaker Having Molded Insulative Casing With A Dead Front", is directed to a compact power circuit breaker which utilizes a molded insulative casing to provide structural support and electrical isolation for the pole mechanisms. A grounded barrier sandwiched between two sections of the molded insulative casing also electrically isolates the operating mechanism from the pole mechanisms and provides shielding for any electronics of the operating mechanism.

There is a need in such a power circuit breaker for providing the molded insulative casing with protection against erosion by arcing which could occur at the pole mechanisms.

SUMMARY OF THE INVENTION

This need and others are satisfied by the invention which is directed to a power circuit breaker which utilizes a molded insulative casing to provide structural support for the pole and operating mechanisms. A grounded barrier between the pole mechanisms and the operating mechanism improves protection of the user from electrical shock and the electronics in an operating mechanism with an electronic trip from electric magnetic interference. An air gap is provided between the molded insulative casing and the grounded barrier to minimize erosion of the molded insulative casing in the event of arcing in a pole mechanism.

More particularly, the invention is directed to a power circuit breaker which comprises a plurality of pole mechanisms each with separable contacts, an operating mechanism coupled to the pole mechanisms to open and close the separable contacts, a grounded barrier between the pole mechanisms and the operating mechanism and a molded insulative casing at least between the grounded barrier and the pole mechanisms. This molded insulative casing forms with the grounded barrier an air gap which is interposed, along with the molded insulative casing and the grounded barrier, between the pole mechanisms and the operating mechanism. Preferably, the molded insulative casing has a recess facing the grounded plane member at each pole mechanism forming the air gap. In a preferred embodiment, the recess is a common recess extending across all of the pole mechanisms. This recess is vented to allow any ionized gases that could be formed by an arc to escape and be replaced with fresh air. Also, preferably, the recess in the molded insulative casing is formed by edge walls and the vents are formed by slots extending outward through these edge walls. These slots can be open slots facing a planar grounded barrier.

Preferably, the molded insulative casing has pole cavities housing each of the pole mechanisms. These pole cavities have a wall spaced from the pole mechanism to interpose an additional air gap between the pole mechanism and the operating mechanism. In its most preferred form, the molded insulative casing has a rear section in which the pole cavities and the recess are formed and a forward section between the grounded barrier and the operating mechanism.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
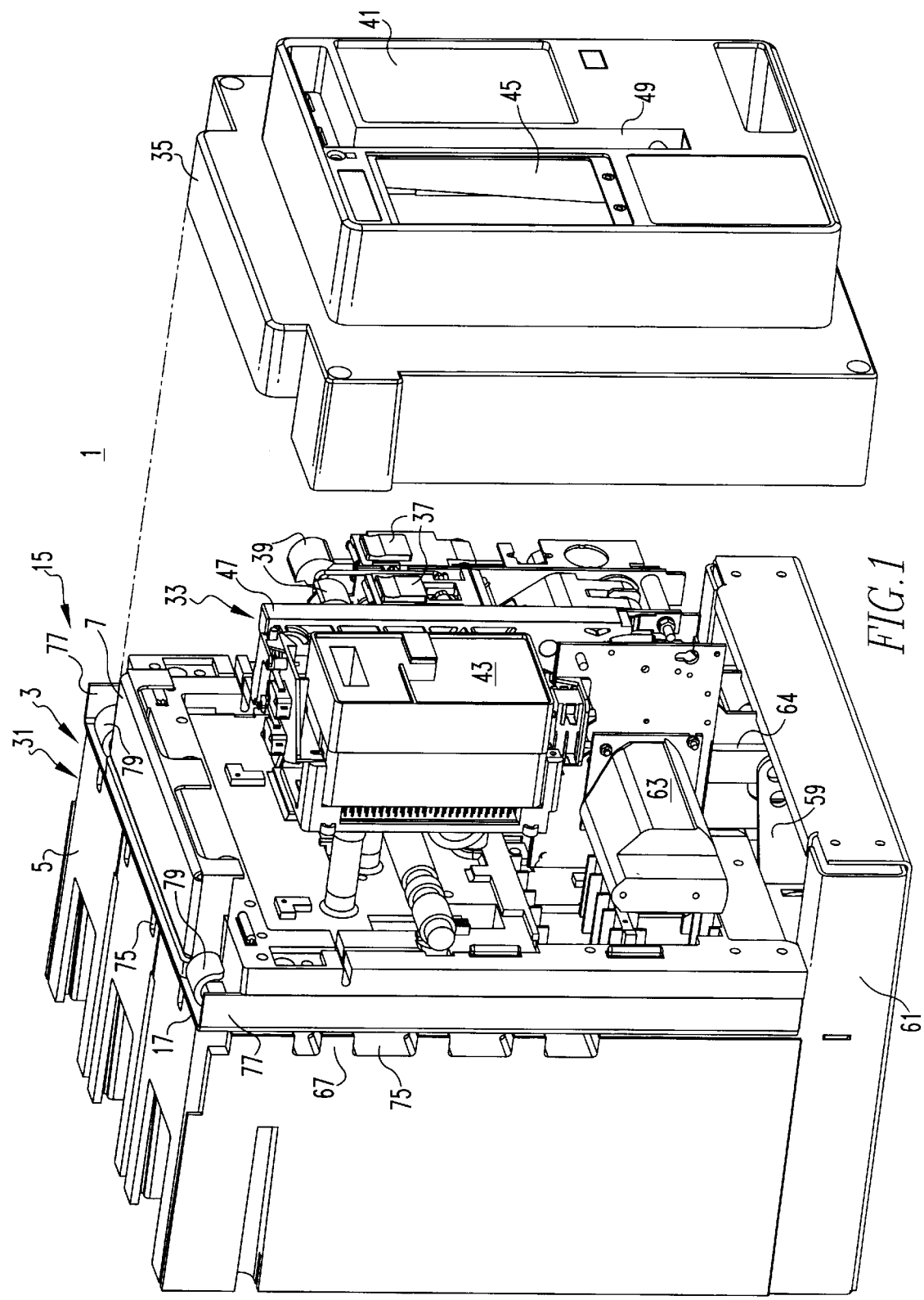
FIG. 1 is an isometric view of the front of a circuit breaker in accordance with the invention with the cover removed.
Figure 2:
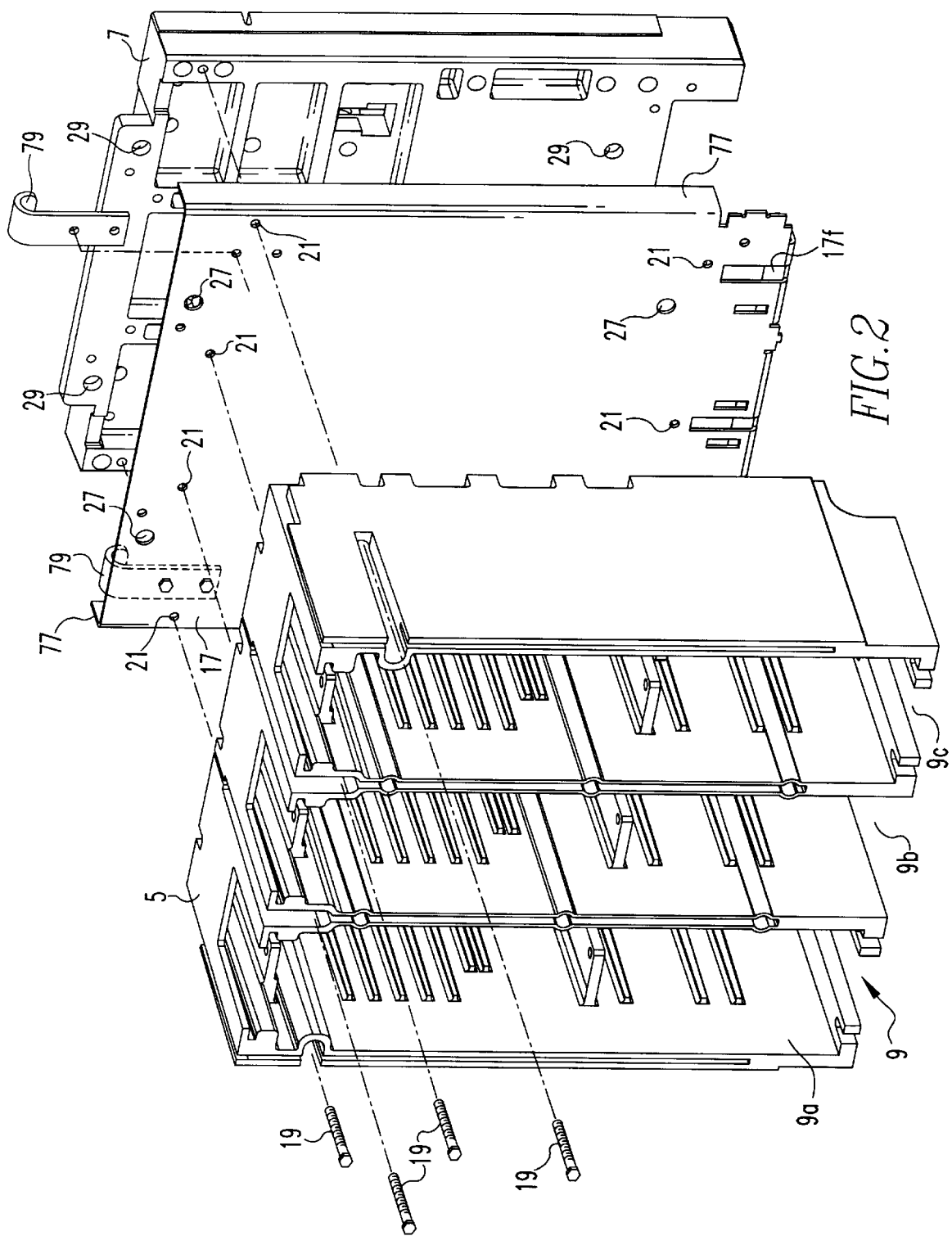
FIG. 2 is an exploded isometric view of the molded insulative casing and grounded barrier forming part of the circuit breaker of FIG. 1 viewed from the rear.
Figure 3:
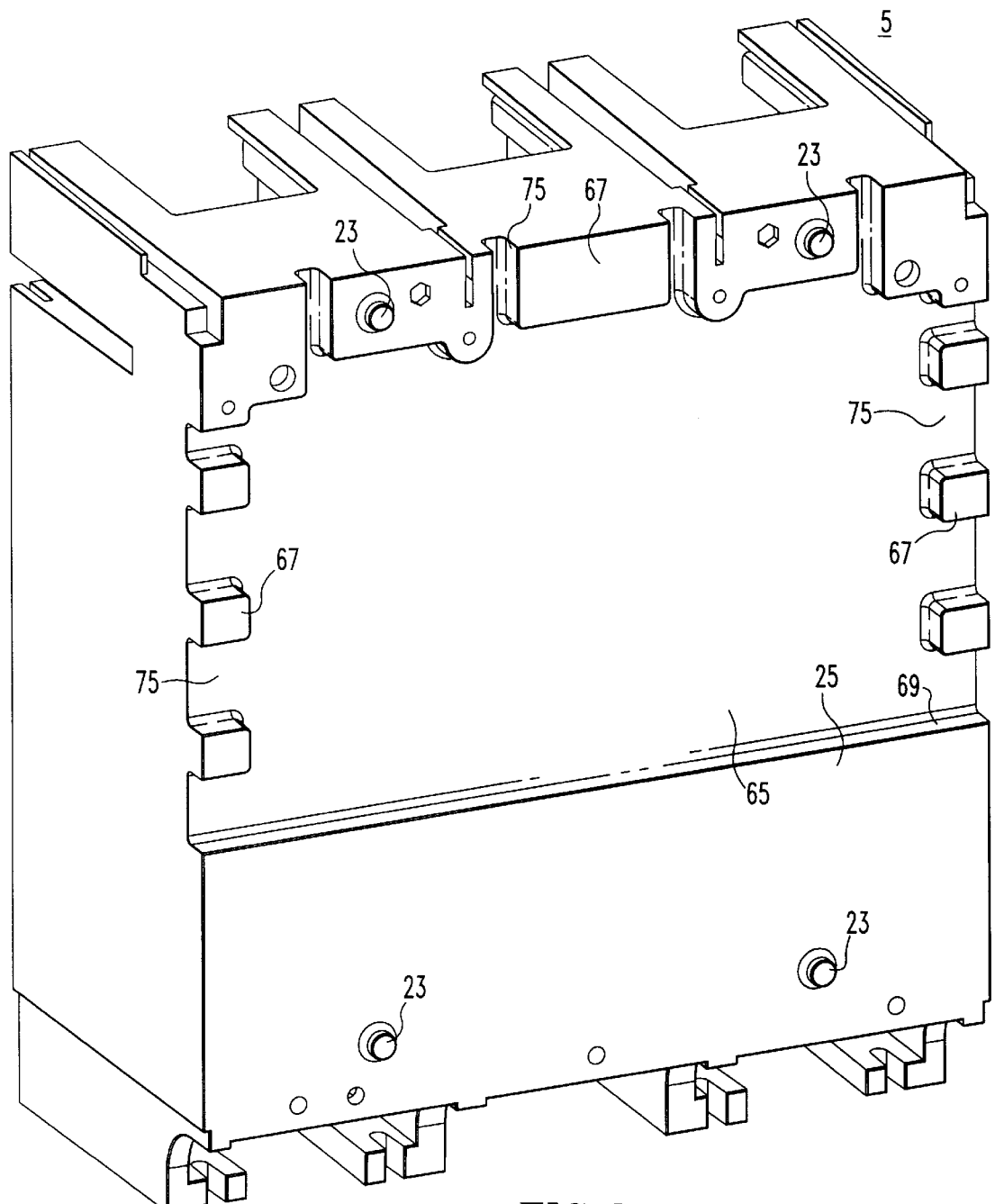
FIG. 3 is an isometric view of the front of the rear section of the molded insulative case which forms part of the circuit breaker of FIG. 1.

Referring to FIG. 1, the circuit breaker 1 of the invention is a multipole power breaker which has a molded insulative casing 3 divided into a rear section 5 and a forward section 7. These sections of the casing are molded from an electrically insulative material such as glass polyester. The rear casing 5, which is best viewed in FIGS. 2 and 3 is molded as a single piece with a plurality of pole cavities 9. The exemplary circuit breaker 1 has three such pole cavities $9_a-9_c$, one for each phase of a three-phase distribution system. Each cavity houses a pole mechanism 11 which includes, in the exemplary breaker, a vacuum interrupter 13 as seen in FIG. 4.

The power circuit breaker 1 further includes a grounding system 15 which includes a grounded barrier in the form of planar member 17 which is sandwiched between the rear section 5 and the forward section 7 of the molded insulative casing 3. These components are clamped together by a number of fasteners 19 in the form of bolts which extend through apertures 21 in the grounded barrier 17. Pins 23 molded on the front face 25 of the rear section 5 of the molded casing 3 pass through additional apertures 27 in the grounded barrier 17 and engage holes 29 in the rear of the forward section 7. This arrangement produces a rigid support structure 31 incorporating a dead front provided by the grounded barrier 17.

The power circuit breaker 1 further includes an operating mechanism 33 which is attached to the front of the forward section 7 of the molded insulative casing 3. Preferably, this operating mechanism 33 is a compact, modular high energy operating mechanism of a type such as that described in U.S. Pat. No. 5,931,290 which is hereby incorporated by reference. The operating mechanism 33 is enclosed by a cover 35 which is preferably molded of an insulative material, again such as glass polyester. The operating mechanism 33 includes controls on its front face such as the push buttons 37 and indicators 39 which are accessible through an opening 41 in the cover 35. A trip unit 43 mounted on the front of the operating mechanism 33 is accessible through another opening 45 in the cover. In addition, a handle 47 for manually charging the operating mechanism is accessible through slot 49 in the cover.

Figure 4:
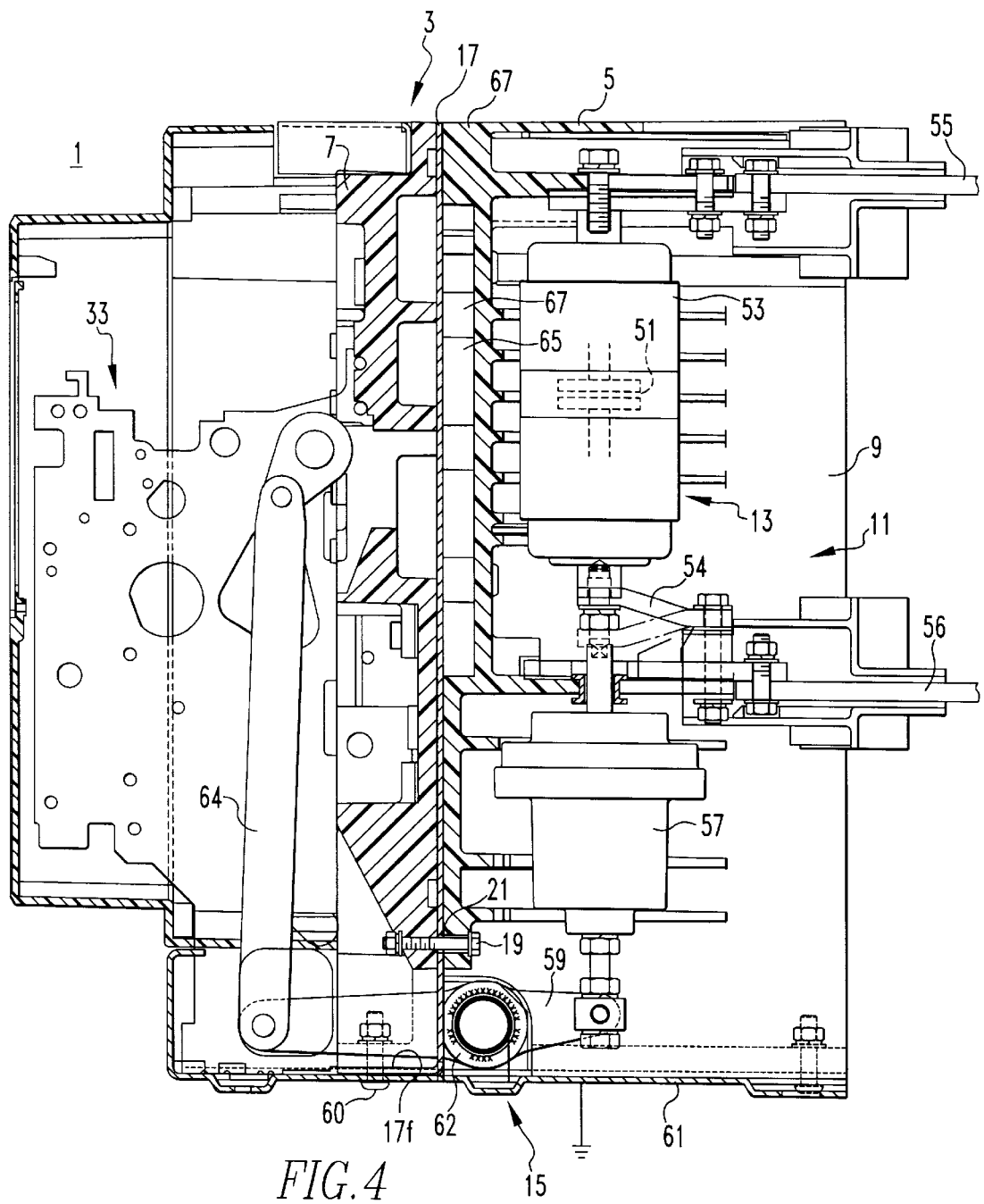
FIG. 4 is a longitudinal vertical section through the circuit breaker of FIG. 1.

As best seen in FIG. 4, the vacuum interrupters have separable contacts 51 housed in a vacuum bottle 53. The upper or fixed contact of the separable contacts 51 is electrically connected to a line conductor 55 which extends rearward for connection to a utility bus (not shown). The lower, or moveable, contact of the separable contacts 51 is connected by a flexible shunt 54 to a load conductor 56 which likewise extends rearward for connection to a load bus (not shown). The moveable contact is mechanically connected through an insulator/drive unit 57, which provides electrical isolation and a spring bias, to an operating linkage in the form of a bell crank 59. The bell crank 59 is pivotally mounted in an electrically conductive pan 61 which extends under the molded insulative casing 3. This electrically conductive pan 61 forms part of the grounding system 15 and is directly secured by bolt 60 to, and therefore is in electrical contact with, the flange 17f on the grounded barrier 17. The bell cranks 59) which are provided for each of the vacuum interrupters 13 are made of steel plate and are pivotally mounted to electrically conductive metal mounts 62 bolted to the pan 61 so that linkages are also electrically grounded. The forward ends of the bell cranks 59 are connected to the operating mechanism 33 by a linkage 64.

As is conventional, the operating mechanism 33 includes a close spring (not shown) which is charged either manually through operation of the handle 47 or automatically through a motor 63. The separable contacts 51 in each of the poles are closed by releasing the close spring, either manually by depressing the appropriate pushbutton 37, or remotely through a shunt trip, either of which operates the insulator/drive units 57 through the linkages 59. The separable contacts 51 are opened utilizing the energy stored in an open spring (also not shown) in the operating mechanism 33. The separable contacts 51 can be opened automatically by the trip unit 43 in response to certain current/time characteristics of current flowing through the circuit breaker, manually by pushing the appropriate pushbutton 37, or remotely by another solenoid (not shown).

The energy used in opening and closing the separable contacts generates forces which tend to distort the circuit breaker structure. However, the molded insulative casing 3 provides a stiff structure which results in fewer losses than the metal boxes used in the current power circuit breakers in this range. In addition, the molded insulative casing 3 provides the required electrical isolation while the grounded barrier 17 provides a dead front which protects an operator accessing the pushbuttons 37, handle 47 and the trip unit 43 from the high voltage in the pole mechanisms 11.

As can be seen from FIGS. 3 and 4, the front face 25 of the rear section 5 of the molded insulative casing 3 has a recess 65 adjacent the vacuum interrupters 13 in the pole cavities 9a–9c. This recess 65, which is formed by side edge and top edge walls 67 and a bottom ledge 69, provides an air gap between the insulative material of the casing 3 and the grounded barrier 17. Preferably, a common recess 65 extends across the face 25 of the rear section of the molded insulative case 3. This air gap, together with the air gap 71 in the pole cavities 9 between the vacuum interrupters 13 and the forward wall 73 of the pole cavities, provides increased protection from arcs that could burn through the casing due to a fault in a pole cavity. This recess 65 is vented laterally and vertically by slots 75 through the edge walls 67 of the casing 3 to prevent buildup of condensation and to exhaust ionized air.

The grounded barrier 17 is an electrically conductive plate such as a steel plate extending fully across the confronting faces of the rear section 5 and forward section 7 of the molded insulative casing 3. As shown in FIGS. 1 and 2, flanges 77 extend forward along the side edges of the planar grounded barrier 17. The rounded corners produced by these edges reduce the field stress points at the ends of the planar barrier and eliminate sharp edges. Alternatively, the planar grounded barrier could extend out laterally both horizontally and vertically beyond the molded insulative casing 3 to mate with the dead front of a switchgear assembly in which the circuit breaker can be installed thereby forming a shield which protects the operator from blast caused by a fault. Lifting straps 79 are secured to the grounded barrier 17 for handling the power circuit breaker 1.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A power circuit breaker comprising:

a plurality of pole mechanisms each comprising separable contacts;

an operating mechanism coupled to said pole mechanisms for opening and closing said separable contacts;

a grounded barrier between said pole mechanisms and said operating mechanism; and a molded insulative casing supporting and extending between said pole mechanisms and said operating mechanism and forming with said grounded barrier an air gap which is interposed along with said molded insulative casing and said grounded barrier between said pole mechanisms and said operating mechanism.

2. The power circuit breaker of claim 1 wherein said molded insulative casing has a recess facing said grounded barrier at each pole mechanism forming said air gap.

3. The power circuit breaker of claim 2 wherein said recess is a common recess extending across all of said plurality of pole mechanisms.

4. The power circuit breaker of claim 3 wherein said molded insulative casing has a plurality of pole cavities each housing one of said plurality of pole mechanisms, said pole cavities having a wall spaced from said pole mechanism to interpose an additional air gap between said pole mechanism and said operating mechanism.

5. The power circuit breaker of claim 3 including vents for venting said common recess.

6. The power circuit breaker of claim 5 wherein said common recess is formed by edge walls of said molded insulative casing and wherein said vents comprise slots extending outward through said edge walls.

7. The power circuit breaker of claim 6 wherein said grounded barrier is a generally planar member and wherein said molded insulative casing has side edge walls and a top edge wall forming three sides of said common recess and said slots through said edge walls comprise open slots facing said planner member.

8. The power circuit breaker of claim 6 wherein said molded insulative casing has a plurality of pole cavities each housing one of said plurality of pole mechanisms, said pole cavities having a wall spaced from said pole mechanism to interpose an additional air gap between said pole mechanism and said operating mechanism.

9. The circuit breaker of claim 3 wherein said molded insulative casing includes a rear section between said grounded barrier and said pole mechanisms and forming said air gap, and a forward section between said grounded barrier and said operating mechanism, said grounded barrier being sandwiched between said rear section and said forward section of said molded insulative casing.

10. The power circuit breaker of claim 9 wherein said grounded barrier comprises a generally planar member in wherein said recess is formed in said rear section of said molded insulative casing by edge walls facing said planar member, and including slots extending outward through said edge walls and open toward said planar member to vent said common recess.

* * * * *